US012803701B2

(12) United States Patent
Baracca et al.

(10) Patent No.: US 12,803,701 B2
(45) Date of Patent: Nov. 17, 2026

(54) DEVICES, METHODS AND APPARATUSES FOR UPLINK TRANSMISSION

(71) Applicant: Nokia Technologies Oy, Espoo (FI)

(72) Inventors: Paolo Baracca, Munich (DE); Samantha Caporal Del Barrio, Aalborg (DK); Ali Karimidehkordi, Munich (DE); Juha Pekka Karjalainen, Oulu (FI); Sami-Jukka Hakola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 428 days.

(21) Appl. No.: 18/475,594

(22) Filed: Sep. 27, 2023

(65) Prior Publication Data

US 2024/0154716 A1 May 9, 2024

(30) Foreign Application Priority Data

Nov. 4, 2022 (GB) ..................................... 2216429

(51) Int. Cl.
*H04L 1/00* (2006.01)
*H04B 17/336* (2015.01)

(52) U.S. Cl.
CPC ......... *H04L 1/0017* (2013.01); *H04B 17/336* (2015.01)

(58) Field of Classification Search
CPC ............... H04W 72/21; H04W 72/046; H04W 72/0473; H04W 72/23; H04W 72/0406;
(Continued)

(56) References Cited

U.S. PATENT DOCUMENTS 12,432,725 B2 * 9/2025 Chung ............... H04B 7/06968
2012/0093020 A1 * 4/2012 Iwai .................... H04W 52/365
370/252
(Continued)

FOREIGN PATENT DOCUMENTS

EP 4013129 A1 6/2022
WO 2019/160384 A1 8/2019
(Continued)

OTHER PUBLICATIONS

Extended European Search Report received for corresponding European Patent Application No. 23194276.4, dated Feb. 27, 2024, 9 pages.
(Continued)

*Primary Examiner* — Un C Cho
*Assistant Examiner* — Rasha K Fayed
(74) *Attorney, Agent, or Firm* — Robert P. Michal, Esq.; Rimon PC

(57) ABSTRACT

Embodiments of the present disclosure disclose devices, methods and apparatuses for uplink transmission. A terminal device measures at least two reference signals from a network device. Moreover, the terminal device transmits, to the network device, a mode indication of uplink transmission for multiple transmission and reception points (m-TRP) based on the measured at least two reference signals. The mode indication indicates information on a preferred one of frequency division multiplexing (FDM) transmission modes. The FDM transmission modes comprise at least a first FDM transmission mode and a second FDM transmission mode.

1 Claim, 10 Drawing Sheets

(58) Field of Classification Search

CPC ............ H04W 72/20; H04W 72/1268; H04W 72/1289; H04W 72/1284; H04W 72/02; H04W 72/0413; H04W 72/042; H04W 72/0446; H04W 72/10; H04W 72/56; H04W 72/044; H04W 72/0453; H04W 16/28; H04W 36/0069; H04W 36/00698; H04W 36/00692; H04W 48/16; H04W 52/365; H04W 52/248; H04W 52/08; H04W 52/146; H04W 52/242; H04W 52/42; H04W 52/58; H04W 76/15; H04W 76/16; H04W 88/06; H04W 80/06; H04L 1/0017; H04L 1/1896; H04L 1/1854; H04L 1/0003; H04L 1/0009; H04L 1/08; H04L 5/0035; H04L 5/0053; H04L 5/0094; H04L 5/0055; H04L 5/0096; H04L 5/0007; H04L 5/001; H04L 5/0048; H04L 5/005; H04L 5/0051; H04L 5/0091; H04L 5/0092; H04L 5/0057; H04L 27/0006; H04L 27/2601; H04L 25/0226; H04L 25/00; H04B 17/336; H04B 17/364; H04B 7/024; H04B 7/0689; H04B 7/12; H04B 7/0639; H04B 7/02; H04B 7/0404; H04B 7/0413; H04B 7/06966; H04B 7/06968; H04B 7/088; H04B 7/063; H04B 7/0602; H04B 7/0665; H04B 7/0626; H04B 7/0452; H04B 7/0466; H04B 7/0486; H04B 7/0632; H04B 7/0645

See application file for complete search history.

(56) References Cited

U.S. PATENT DOCUMENTS

2018/0206132 A1* 7/2018 Guo ...................... H04W 16/28
2019/0149365 A1* 5/2019 Chatterjee ............ H04W 76/11 370/329
2019/0260448 A1* 8/2019 Rahman ............... H04B 7/0626
2021/0014893 A1* 1/2021 Park ...................... H04L 5/0092
2021/0195616 A1* 6/2021 Venugopal ............ H04L 5/0094
2021/0243782 A1* 8/2021 Miao ..................... H04L 5/0091
2021/0329508 A1* 10/2021 Gopal ................... H04W 76/15
2021/0352629 A1* 11/2021 Haghighat ............ H04L 1/1896
2021/0359806 A1* 11/2021 Levitsky ............... H04L 5/0048
2022/0038935 A1* 2/2022 Xiong ................... H04L 1/0026
2022/0173866 A1* 6/2022 Wang ........................ H04J 3/02
2022/0311571 A1* 9/2022 Cheng ..................... H04L 5/005
2022/0312334 A1* 9/2022 Gao ...................... H04L 1/0003
2022/0322457 A1* 10/2022 Abdelghaffar ........ H04W 24/08
2022/0377810 A1* 11/2022 Bhamri ................ H04B 7/0695
2023/0100135 A1* 3/2023 Liu ....................... H04W 24/08 370/252
2023/0171763 A1* 6/2023 Gao ...................... H04W 52/08 370/329
2023/0189058 A1* 6/2023 Yeh ....................... H04W 48/18 370/329
2023/0269057 A1* 8/2023 Sengupta ............. H04L 5/0092 370/329
2023/0284149 A1* 9/2023 Zhu ....................... H04W 16/28 370/318
2023/0403640 A1* 12/2023 Kunz ...................... H04W 8/02
2024/0072981 A1* 2/2024 Zhu ....................... H04L 5/0094

FOREIGN PATENT DOCUMENTS

WO 2021/209979 A1 10/2021
WO 2022/217183 A1 10/2022

OTHER PUBLICATIONS

"3rd Generation Partnership Project; Technical Specification Group Radio Access Network; NR; Physical layer procedures for control (Release 17)", 3GPP TS 38.213, V17.3.0, Sep. 2022, pp. 1-260.

"3rd Generation Partnership Project; Technical Specification Group Radio Access Network; NR; Physical layer procedures for data (Release 17)", 3GPP TS 38.214, V17.3.0, Sep. 2022, pp. 1-232.

"New WID: MIMO Evolution for Downlink and Uplink", 3GPP TSG RAN Meeting #94e, RP-213598, Agenda: 8A.1, Samsung, Dec. 6-17, 2021, 6 pages.

"Summary on Rel-18 STxMP", 3GPP TSG RAN WG1 #110, R1-220xxxx, Agenda: 9.1.4.1, OPPO, Aug. 22-26, 2022, 40 pages.

"3rd Generation Partnership Project; Technical Specification Group Radio Access Network; NR; General aspects for BS RF for NR (Release 15)", 3GPP TR 38.817-02, V0.7.0, Mar. 2018, 99 pages.

"Msc-generator", Sourceforge, Retrieved on Sep. 8, 2023, Webpage available at : https://sourceforge.net/projects/msc-generator/.

Khoshnevisan et al., "Enhanced Reliability and Capacity with Multi-TRP Transmission", IEEE Communications Standards Magazine, vol. 6, No. 1, Mar. 2022, pp. 13-19.

Dragoni et al., "Link-Level Investigations of Hybrid-ARQ schemes for 5G Urllc Scenarios", 24th International ITG Workshop on Smart Antennas, Feb. 18-20, 2020, pp. 1-6.

Tuomaala et al., "Effective SINR approach of link to system mapping in OFDM/multi-carrier mobile network", 2nd Asia Pacific Conference on Mobile Technology, Applications and Systems, Nov. 15-17, 2005, 5 pages.

Frederiksen et al., "Performance and modeling of WCDMA/HSDPA transmission/H-ARQ schemes", Proceedings IEEE 56th Vehicular Technology Conference, Sep. 24-28, 2002, pp. 472-476.

Hamidi-Sepehr et al., "Analysis of 5G LDPC Codes Rate-Matching Design", IEEE 87th Vehicular Technology Conference (VTC Spring), Jun. 3-6, 2018, 5 pages.

Combined Search and Examination Report received for corresponding United Kingdom Patent Application No. 2216429.7, dated May 19, 2023, 3 pages.

* cited by examiner

DEVICES, METHODS AND APPARATUSES FOR UPLINK TRANSMISSION

RELATED APPLICATION

This application claims priority to, and the benefit of, GB Application No. 2216429.7, filed on Nov. 4, 2022, the contents of which is incorporated herein by reference in its entirety.

FIELD

Embodiments of the present disclosure generally relate to the field of communication, and in particular, to devices, methods, apparatuses and computer readable storage medium for uplink transmission.

BACKGROUND

In a communication network, user equipment (UE) may have multiple antenna panels and the base station may have multiple transmission and reception points (m-TRP) to facilitate communication between the panels of the UE and m-TRP of the base station. m-TRP schemes have been studied and specified in 3$^{rd}$ generation partnership project (3GPP).

In release 16 (Rel-16) of 5$^{th}$ generation technology standard for broadband cellular networks (5G) system (5GS), several m-TRP schemes have then been defined for physical downlink shared channel (PDSCH), for example, spatial division multiplex (SDM), non-coherent joint transmission (NCJT), time division multiplex (TDM), and frequency division multiplex (FDM). Release 17 (Rel-17) of 5G system focused on introducing m-TRP schemes also for physical downlink control channel (PDCCH), physical uplink shared channel (PUSCH), and physical uplink control channel (PUCCH). But enhancements on uplink transmission for m-TRP are still in further investigation.

SUMMARY

In general, example embodiments of the present disclosure provide devices, methods, apparatuses and computer readable storage medium for dynamic switching between uplink FDM transmission modes.

In a first aspect, there is provided a terminal device. The terminal device may comprise one or more transceivers; and one or more processors communicatively coupled to the one or more transceivers, and the one or more processors are configured to cause the terminal device to: measure at least two reference signals from a network device; and transmit, to the network device, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In a second aspect, there is provided a network device. The network device may comprise one or more transceivers; and one or more processors communicatively coupled to the one or more transceivers, and the one or more processors are configured to cause the network device to: transmit, to a terminal device, at least two reference signals; and receive, from the terminal device, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode.

In a third aspect, there is provided a method implemented at a terminal device. The method may comprise: measuring at least two reference signals from a network device; and transmitting, to the network device, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In a fourth aspect, there is provided a method implemented at a network device. The method may comprise: transmitting, to a terminal device, at least two reference signals; and receiving, from the terminal device, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode.

In a fifth aspect, there is provided an apparatus of a terminal device. The apparatus may comprise: means for measuring at least two reference signals from a network device; and means for transmitting, to the network device, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In a sixth aspect, there is provided an apparatus of a network device. The apparatus may comprise: means for transmitting, to a terminal device, at least two reference signals; and means for receiving, from the terminal device, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode.

In a seventh aspect, there is provided a terminal device. The terminal device may comprise at least one processor; and at least one memory including computer program codes, wherein the at least one memory and the computer program codes are configured to, with the at least one processor, cause the terminal device to: measure at least two reference signals from a network device; and transmit, to the network device, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In an eighth aspect, there is provided a network device. The network device may comprise at least one processor; and at least one memory including computer program codes, wherein the at least one memory and the computer program codes are configured to, with the at least one processor, cause the network device to transmit, to a terminal device, at least two reference signals; and receive, from the terminal device, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode.

In a ninth aspect, there is provided a non-transitory computer readable medium comprising program instructions for causing an apparatus to perform at least the method according to third or fourth aspect.

In a tenth aspect, there is provided a computer program comprising instructions, which, when executed by an apparatus, cause the apparatus at least to: measure at least two reference signals from a network device; and transmit, to the network device, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In an eleventh aspect, there is provided a computer program comprising instructions, which, when executed by an apparatus, cause the apparatus at least to: transmit, to a terminal device, at least two reference signals; and receive, from the terminal device, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode, In a twelfth aspect, there is provided a terminal device. The terminal device may comprise measuring circuitry configured to measure at least two reference signals from a network device; and transmitting circuitry configured to transmit, to the network device, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In a thirteenth aspect, there is provided a network device. The network device may comprise transmitting circuitry configured to transmit, to a terminal device, at least two reference signals; and receiving circuitry configured to receive, from the terminal device, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
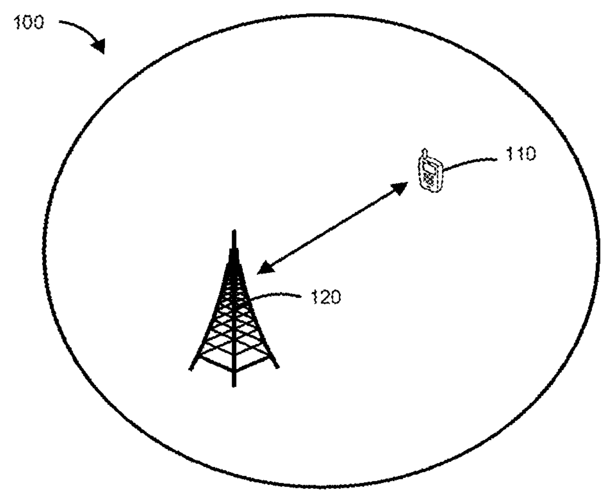
FIG. 1 illustrates an example network environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a New Radio (NR) NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As stated above, m-TRP schemes have been studied and specified in the last couple of years by the third-generation partnership project 3GPP.

Rel-16 has focused on PDSCH, in which two different frameworks, that is, single downlink control information (single-DCI), and multiple DCI (multi-DCI) have been introduced. The single-DCI may be used to support scenarios with ideal backhaul available among the TRPs, that for instance can make joint scheduling decisions. The multi-DCI may be used to support scenarios with non-ideal backhaul among the TRPs, where each TRP uses its own DCI to schedule downlink data transmission independently.

In addition, several m-TRP schemes have then been defined for PDSCH, for instance, SDM, NCJT, TDM, and FDM. Rel-17 then focused on introducing m-TRP schemes also for PDCCH, PUSCH, and PUCCH.

Further work on m-TRP for the uplink is expected in release 18 (Rel-18) of 5GS. In Rel-18, work item description (WID) for multiple input multiple output (MIMO) evolution for downlink and uplink include items for facilitating simultaneous multi-panel uplink transmission for higher uplink throughput/reliability.

In addition, it is also considering an SDM scheme, an FDM-B scheme, an FDM-A scheme, an SDM repetition scheme for PUSCH and an FDM-A scheme, an FDM-B scheme, an SFN scheme, one UCI scheme and a CDM scheme for PUCCH, in m-TRP. Each of these m-TRP scheme may provide benefits under specific channel conditions.

Inventors notice that a preferred m-TRP scheme should be UE (terminal device) specific configuration. Terminal devices with different channel conditions and service requirements will benefit from the activation of different m-TRP schemes. For example, a terminal device with a very good channel toward one TRP and a bad one toward another TRP will not benefit from the m-TRP at all. In this case, a single TRP mode may be used.

Besides, inventors also notice that a dynamic switching (adaptation) should be considered. As channel conditions may vary rapidly, it is beneficial for a specific terminal device to switch between the m-TRP schemes in a very fast manner.

It may be a possible solution to determine the uplink transmission mode at the network device based on its own measurements, which, obviously, has some disadvantages, particularly, a high implementation complexity. On one hand, for uplink, the network device can measure the signal-to-interference-plus-noise ratio (SINR) on each link, whereas the terminal device can only measure the channel gain in downlink (which is equivalent to the channel gain in uplink because of the channel reciprocity). The terminal device in turn needs to combine the configured terminal device transmit power and the prediction of gNB noise power to estimate the uplink signal-to-noise ratio (SNR) of the terminal device. This solution may work well, especially when the reciprocity may be exploited.

Therefore, the terminal device may not be aware of the interference level at the gNB for the uplink transmission. On the other hand, this might not represent a large problem in, for example, frequency range 2 (FR2), where, because of beamforming, the SINR is negatively impacted mainly by blockages/path-loss/doppler rather than interference.

Beamforming may be referred to as spatial filtering, directional transmission, or directional reception. Beamforming is a signal processing technique that may be used at a transmitting device and/or a receiving device to shape or steer an antenna beam along a spatial path between the transmitting device and the receiving device. Beamforming may rely on antenna elements of an antenna array for signals propagating at specific orientations.

On the other hand, the network device is not fully aware of the terminal device capabilities and implementations (e.g., in probing different beams and/or activating/deactivating antenna elements), and that could be relevant information useful for deciding the TRP mode to be used.

In view of the above, for enhancements on uplink transmission for m-TRP, enhanced solutions regarding switching among different m-TRP schemes shall be supported. Therefore, there is a need for improved solutions for dynamic switching between different m-TRP schemes, especially switching between UL FDM schemes.

The present disclosure focus more on the FDM for the following reasons. The FDM represents a simpler solution when compared to the SDM, as a single data layer is sent in each physical resource block (PRB), thus allowing simpler reception at the receiver. Besides, when compared to the TDM, the FDM better fits low latency applications as both TRPs transmit simultaneously, whereas in the TDM they are multiplexed in the time domain.

In view of this, embodiments of the present disclosure provides a solution for dynamic switching between uplink FDM transmission modes. In this solution, a terminal device measures at least two reference signals from a network device. Moreover, the terminal device further transmits, to the network device, a mode indication of uplink transmission for m-TRP based on the measured at least two reference signals. The mode indication indicates information on a preferred one of FDM transmission modes. The FDM transmission modes comprise at least a first FDM transmission mode and a second FDM transmission mode.

By utilizing the mode indication from the terminal device, it is possible to facilitate a dynamic switching between uplink FDM transmission modes, thereby improving the uplink transmission for m-TRP. In this way, it is possible to ensure high throughput and reliability with m-TRP, and thus improve transmission performance and efficiency.

Hereinafter, principle and embodiments of the present disclosure will be described in detail below with reference to the accompanying drawings. Reference is first made to FIG. 1, which illustrates an example network environment 100 in which example embodiments of the present disclosure can be implemented.

The network environment 100, which may be a part of a communication network, comprises a terminal device 110 and a network device 120 communicating with each other or with other devices via each other.

The network environment 100 may comprise any suitable number of devices and cells. In the network environment 100, the terminal device 110 and the network device 120 can communicate data and control information with each other. A link from the network device 120 to the terminal device 110 is referred to as a downlink (DL), while a link from the terminal device 110 to the network device 120 is referred to as an uplink (UL).

In some embodiments, the terminal device 120 may be served by multiple TRPs. The multiple TRPs may be associated with the network device 110. In some embodiments, some of the multiple TRPs may be associated with a network device in a cell and some of the multiple TRPs may be associated with another network device in another cell.

In some embodiments, the network device may be associated with multiple TRPs in different geographical locations to achieve better coverage. In alternative embodiments, the network device 110 may be associated with multiple TRPs distributed in a same geographical location to achieve a relatively fast communication speed.

It is to be understood that the number of the terminal device 120, the number of the network device 110, and the number of TRPs as shown in the communication network environment 100 are only for the purpose of illustration, without any limitation to the scope of the present disclosure. In some example embodiments, the communication network environment 100 may include any number of terminal devices, any number of network devices, and/or any number of TRPs. And in addition, each network device 110 according to embodiments of the present disclosure may support any number of TRPs.

It is to be understood that two devices are shown in the network environment 100 only for the purpose of illustration, without suggesting any limitation to the scope of the present disclosure. In some example embodiments, the network environment 100 may comprise a further device to communicate with the terminal device 110 and network device 120.

The communications in the network environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connectivity (DC), and New Radio Unlicensed (NR-U) technologies.

In some example embodiments, the network device 120 transmits reference signals to the terminal device 110, the terminal device 110 may then measure the reference signals and transmit, to the network device, a mode indication of uplink transmission to indicate information on a preferred one of FDM transmission modes, wherein the FDM transmission modes comprise at least a first FDM transmission mode and a second FDM transmission mode.

Figure 2:
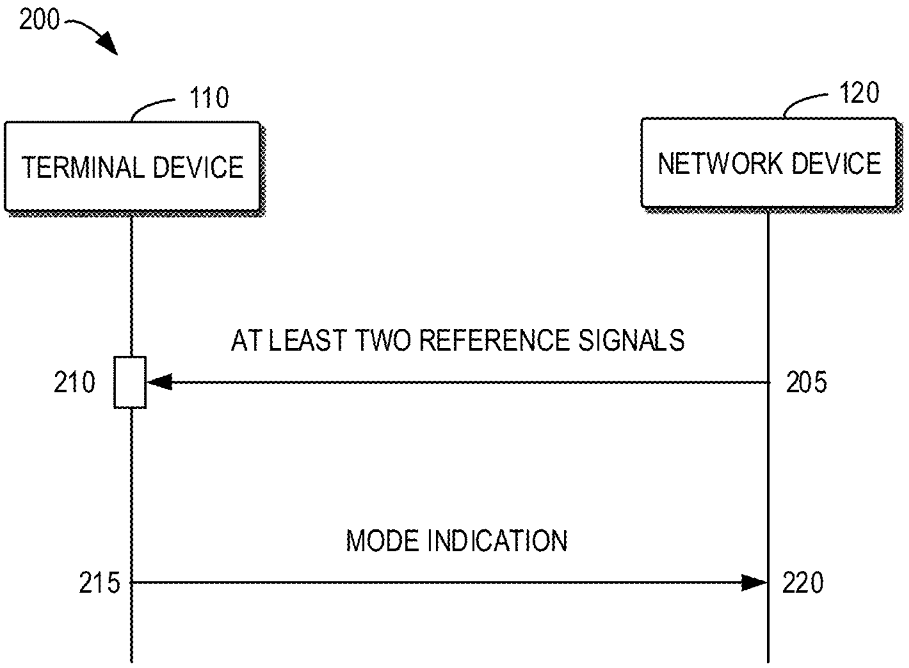
FIG. 2 illustrates an example signaling flow between the terminal device and the network device according to some example embodiments of the present disclosure.

FIG. 2 illustrates an example signaling flow 200 between the terminal device and the network device according to some example embodiments of the present disclosure. For the purpose of discussion, the signaling flow 200 will be described with reference to FIG. 1.

As shown in FIG. 2, the network device 120 transmits (205), to the terminal device 110, at least two reference signals. The reference signal may comprise, for example, a channel state information reference signal (CSI-RS). The at least two reference signals may be transmitted respectively from at least two TRPs. For example, each of the at least two reference signals may be associated with one transmission configuration indication (TCI) state, wherein each TCI state may represent one of the at least two TRPs. As another example, each of the at least two reference signals may be associated with one of the at least two TRPs.

Accordingly, the terminal device 110 measures (210) the at least two reference signals from the network device 120. In some example embodiments, the terminal device 110 may have multiple panels and the network device 120 may configure the terminal device 110 with at least two of the multiple panels to operate in a m-TRP mode. In this case, for example, the terminal device 110 may measure for example reference signal received power (RSRP) for each TRP and each panel.

The FDM-A may indicate that different parts of a frequency domain resource of one uplink transmission are transmitted with different TCI states configured for the terminal device 110. The FDM-B may indicate that two uplink transmission occasions are transmitted with different TCI states configured for the terminal device 110 on non-overlapping frequency resources and a same time-domain resource.

In some example embodiments, the terminal device 120 may be configured with a dynamic switching between FDM transmission modes, for example, for simultaneous PUSCH and/or PUCCH transmission for the terminal device 110. For example, the FDM transmission modes may comprise at least a first FDM transmission mode and a second FDM transmission mode different from the first FDM transmission mode.

As an example, the first FDM transmission mode may comprise the FDM-A and the second transmission mode may comprise the FDM-B. Just for the sake of discussion, the FDM-A and the FDM-B are taken as examples for the first and second FDM transmission modes respectively. It should be understood that the first and second FDM transmission modes may comprise any other types of FDM transmission modes other than the FDM-A and FDM-B, the scope of the present disclosure will not be limited in this regard.

Based on the above configuration regarding the dynamic switching, the terminal device 110 may determine a preferred one of the FDM transmission modes based on the measured at least two reference signals, for example which one of FDM-A or FDM-B is preferred.

In some example embodiments, the preferred one of the FDM transmission modes may be determined based on performance indicators for the FDM transmission modes. For example, when the performance indicator of the first FDM transmission mode is better than that of the second FDM transmission node, the first FDM transmission mode is preferred; otherwise the second FDM transmission mode is preferred.

In some example embodiments, the performance indicators may be at least partly based on uplink SNR between each panel of the terminal device 110 and each TRP with which each of the at least two reference signals is associated. In other words, the performance indicators may be determined based on the uplink SNR between each panel of the terminal device 110 and each TRP. This solution may work well especially if the reciprocity may be exploited.

For example, as RSRP measurements allow the terminal device 110 to estimate the channel gain between each panel and each TRP, the terminal device 110 may estimate the uplink SNR between each panel of the terminal device 110 and each TRP based on the measured RSRP of the at least two reference signals.

In some example embodiments, the uplink SNR may be estimated at the terminal device 110 by taking some other parameters into account. As an example, the terminal device 110 may estimate the uplink SNR based on a configured uplink power control parameter to determine the transmit power. Additionally or alternatively, the terminal device 110 may estimate the uplink SNR based on a power headroom. In this case, the power headroom may also be taken into account to assume maximum transmit power.

Alternatively or additionally, the terminal device 110 may estimate the uplink SNR based on a noise figure prediction (NF) at the network device 120. The prediction of the NF at the network device 120 may be used to determine the thermal noise power. As a simple example implementation, the prediction may be done by using look-up tables with the values agreed in 3GPP [Section 10.3.3, 3GPP38817]: 10 dB for the 24.25-33.4 GHz range and 12 dB for the 37-52.6 GHz range, to which a 2 dB implementation margin is added. For better estimation of the uplink SNR, the network device 120 may signal, for example, NF values or thermal noise power values to the terminal device 110. These values may be signaled, for example, in the configuration phase, through for example a radio resource control (RRC) signaling.

As an example, given the estimated uplink SNR ($SNR_{i,m}$) between panel i of the terminal device 110 and TRP m, the uplink SNR between the panel i and the TRPs may be estimated as for example:

$$SNR_i = \sum_{m=1}^{M} SNR_{i,m},$$

with an assumption of single-DCI based m-TRP operations and the implementation of the joint reception.

Thus, based on the estimation of the uplink SNR, it is allowed to determine the performance indicators. For example, the performance indicators for the FDM transmission modes may comprise any of respective achievable SNRs for the FDM transmission modes; respective achievable spectral efficiencies (SEs) for the FDM transmission modes; respective achievable throughputs for the FDM transmission modes; or respective achievable reliabilities for the FDM transmission modes. Alternatively or additionally, the performance indicators for the FDM transmission modes may also comprise respective block error rates BLERs for the FDM transmission modes.

In some example embodiments, the terminal device 110 may receive, from the network device 120, a configuration message comprising a performance indicator configuration. The performance indicator configuration may indicate a type of performance indicators for determining the preferred one of the FDM transmission modes. For example, which of the above mentioned performance indicator is to be used to determine the preferred FDM transmission mode in the m-TRP transmission.

Figure 3:
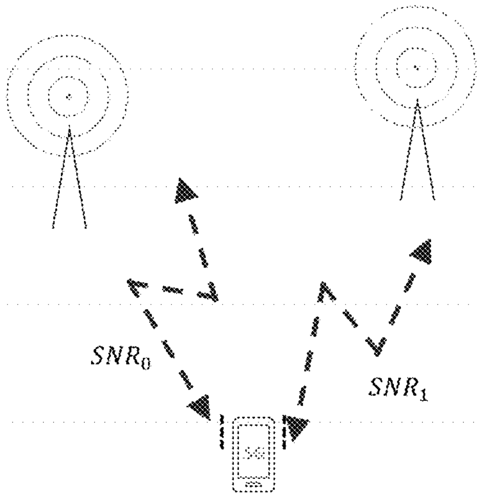
FIG. 3 illustrates an example scenario with a 2-panel terminal device transmitting toward 2 TRPs operating with a single-DCI based m-TRP scheme according to some example embodiments of the present disclosure.

Only for the purpose of illustration, the example determination of the performance indicators based on the above estimated SNRs will be discussed with reference to FIG. 3. FIG. 3 illustrates an example scenario with a 2-panel terminal device transmitting toward 2 TRPs operating with a single-DCI based m-TRP scheme according to some example embodiments of the present disclosure.

As shown in FIG. 3, there are 2 panels, i.e., i=0, 1, at the terminal device 110, and 2 TRPs (M=2). In this case, the first FDM transmission mode is the FDM-A and the second FDM transmission mode is the FDM-B.

For example, with the FDM-A, the same RV 0 may be sent jointly by the two panels of the terminal device 110. The outcome is that the packet will be transmitted partly over PRBs with $SNR_0$ and partly over PRBs with $SNR_1$. To compute the achievable SE when using the FDM-A, a link-to-system mapping may be used, for instance, exponential effective SINR mapping (EESM).

For the FDM-A, with the approximation and assuming just for simplicity that the same number of PRBs is allocated to each panel for transmission of the packet, the achievable SE, $SE_{FDM-A}$, may be written as for example:

$$SE_{FDM-A} = \log_2\left(1 - \beta \ln\left(\frac{1}{2}\left(e^{-SNR_0/\beta} + e^{-SNR_1/\beta}\right)\right)\right) \quad (1)$$

where β is a parameter depending mainly on the selected modulation and coding scheme (MCS).

From the previous equation (1), the achievable SNR, $$SNR_{FDM-A}^{(ac)},$$

may be simply expressed as for example:

$$SNR_{FDM-A}^{(ac)} = -\beta \ln\left(\frac{1}{2}\left(e^{-SNR_0/\beta} + e^{-SNR_1/\beta}\right)\right) \quad (2)$$

For the FDM-B, for example, two implementation options may be considered. In the first implementation option, the same RV, e.g., RV0, may be sent by the two panels of the terminal device 110. In the second implementation option, two different RVs, e.g., RV0 and RV2, may be sent separately by the two panels of the terminal device 110.

In this case, for example, the approximated expression for incremental redundancy (IR)/chase combining (CC) may be used. In the first implementation option, the performance may be equivalent to the hybrid automatic repeat request (HARQ) with CC. In the second implementation option, the performance may be equivalent to the HARQ with IR. Typically, the performance with the IR is strictly better than the CC, although when the SNRs are low, the performance of the two schemes is more or less equivalent, and the CC is typically preferred because of the lower complexity.

For the FDM-B, with the second implementation option for providing better performance, the achievable SE, $SE_{FDM-B}$, may be written as for example:

$$SE_{FDM-B} = \frac{1}{2}\left(\log_2\left(1 + \eta\left(SNR_0 + SNR_1\right)\right)\right) \quad (3)$$

where η depends on the selected MCS.

Also for FDM-B, the achievable SNR, $$SNR_{FDM-A}^{(ac)},$$

may be expressed as:

$$SNR_{FDM-B}^{(ac)} = \sqrt{1 + \eta\left(SNR_0 + SNR_1\right)} - 1. \quad (4)$$

It is to be appreciated that the number of the panels and TRPs is only provided as an example, the similar idea may also be applied to a case with more than 2 panels and/or more than 2 TRPs. The skilled in the art will understand how to implement the solution of other numbers of panels and/or TRPs based on the example description herein and detailed description will not be elaborated herein.

In some example embodiments, the achievable SE/throughput may be computed assuming a fair comparison based on the same frequency allocation for both the first and second FDM transmission modes. Based on such comparison between the performance indicators, the preferred one of the FDM transmission modes (for example, the FDM-A and FDM-B) may be determined as the FDM transmission mode which may achieve a better performance indicator (for example, the achievable SE or the achievable SNR) than the other one.

Alternatively or additionally, a simpler criterion may be used at the terminal device 110 to decide which FDM transmission mode is preferred. In some embodiments, the terminal device 110 may make such a decision based on a gap between signal qualities (for example, SNRs) estimated using the at least two reference signals, a first threshold and/or a second threshold.

Alternatively or additionally, the above first and/or second thresholds may be pre-defined. As an example, in this case, the first FDM transmission mode may be preferred when the gap between the signal qualities is smaller than for example the first threshold, and the second FDM transmission mode may be preferred when the gap between the signal qualities is larger than for example the second threshold. The first threshold and the second threshold may be a same threshold, or may be different.

On this basis, in some example embodiments, the terminal device 110 may trigger a transmission of the mode indication regarding the first FDM transmission mode when the gap between the signal qualities is smaller than the first threshold, or trigger a transmission of the mode indication regarding the second FDM mode when the gap between the signal qualities is larger than or equal to the second threshold.

In some example embodiments, the above first and second thresholds may be configured by the network device 120. As an example, the above configuration message may further comprise a threshold configuration together with the performance indicator configuration, and the threshold configuration may indicate the first and/or second thresholds.

Figure 4:
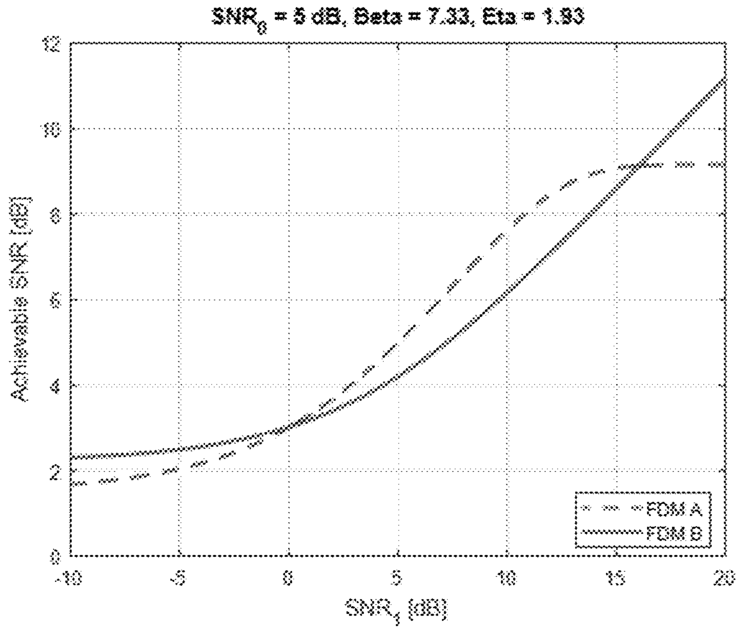
FIG. 4 illustrates an example FDM-A vs FDM-B performance comparison with 16-quadrature Amplitude Modulation (QAM) and 0.75 code rate according to some example embodiments of the present disclosure.

Only for a purpose of illustration, FIG. 4 illustrates an example FDM-A vs FDM-B performance comparison with 16-quadrature Amplitude Modulation (QAM) and 0.75 code rate according to some example embodiments of the present disclosure.

As shown in FIG. 4, achievable SNRs for FDM-A and FDM-B are shown. In FIG. 4, it is assumed that 16-QAM constellation and 0.75 code rate give $\beta$=7.33 and $\eta$=1.93, and the evaluation is done assuming a fixed value of the SNR for the first panel, i.e., $SNR_0$=5 dB, and a variable SNR for the second panel, i.e., $SNR_1$.

From FIG. 4, it can be observed that the FDM-A will provide better performance when the two SNRs are quite similar, for example, when $SNR_0-5\text{ dB}<SNR_1<SNR_0+10$ dB. It can be further observed that the FDM-B will provide better performance when the difference between the two SNRs is large enough, for example, when $SNR_1<SNR_0-5$ dB or $SNR_1>SNR_0+10$ dB.

Besides, the above criterion to decide which the preferred FDM transmission mode based on the gap between signal qualities is applicable. As shown in FIG. 4, when the gap is large enough, the FDM-B is preferred, and when the gap is small, the FDM-A is preferred. Then, the preferred one may be indicated to network device 120 by the terminal device 110.

In some example embodiments, the possibility at the terminal device side to suggest to fall back to a single-TRP mode of operation may also be taken into account. For example, if the gap between the signal qualities measured at the terminal device 110 from the two TRPs is extremely large, for example, 20-30 dB, the performance gain achieved by m-TRP is either negligible or even negative, taking into account potential additional overhead due to the fact that the terminal device 110 is connected to two TRPs instead of one. Therefore, in this case, it may be a better option to fall back to the single-TRP mode.

Referring back to FIG. 2, after the determination of the preferred one of FDM transmission modes based on the measured at least two reference signals, the terminal device 110 transmits (215), to the network device 120, a mode indication of uplink transmission for m-TRP. Accordingly, the network device 120 receives (220) the mode indication of uplink transmission from the terminal device 110. The mode indication may indicate information on the preferred one of FDM transmission modes.

In some example embodiments, the mode indication of uplink transmission may be transmitted by a physical layer signaling, that is, layer 1 (L1) signaling. For example, the reporting of the mode indication may be downlink reference signal (RS) reporting, for example, L1-RSRP reporting. In this case, it is allowed to enable fast switching among the FDM transmission modes. In some other example embodiments, the mode indication of uplink transmission may be transmitted by a media access control control element, MAC CE. Alternatively or additionally, the mode indication of uplink transmission may be transmitted by an RRC signaling.

For example, the mode indication of uplink transmission may comprise the preferred FDM transmission mode. In this case, for example, the FDM-A or the FDM-B may be directly specified, depending on the performance indicator.

As another example, the mode indication of uplink transmission may comprise estimated uplink SNRs for the at least one reference signal. For example, the mode indication of uplink transmission may comprise the estimated SNRs for each panel and each TRP. In this case, it may be feasible for M=2 TRPs and N=2 terminal device panels; for a large number of TRPs and panels on the other hand, as it would require the reporting of M*N values, that may cause a large signaling overhead.

In the embodiments in which the value M and N is large, it may utilize a low-overhead option, for example, by associating to each TRP just the panel with the strongest channel, thus reporting just M values (instead of M*N). Besides, as an example, in case the terminal device 110 probes multiple beams, the reported estimated SNRs could also be for each beam.

As a further example, the mode indication of uplink transmission may comprise performance indicators for the FDM transmission modes. For example, in the example embodiments where achievable SNRs for the FDM transmission modes are applied, the reported estimated SNRs may also be for each beam in case the terminal device 110 probes multiple beams.

Alternatively or additionally, the mode indication of uplink transmission may comprise an RV indication for the second FDM transmission mode, if the second FDM transmission mode (for example, the FDM-B) is preferred. In this case, if the terminal device 110 suggests the second FDM transmission mode, the terminal device 110 may add also an indication about the RVs to be used by the two TRPs. For example, the terminal device 110 may suggest using the same RV to implement CC, in case the SNRs estimated using the at least two reference signals are both rather low. On the contrary, the terminal device 110 may suggest using different RVs to implement IR, in case the SNRs estimated using the at least two reference signals are both rather high.

As another example, in the cases where IR is used, the terminal device 110 may also suggest specific RVs to be used. As the order of RVs may have an impact on the performance for certain SNR conditions, it may be better to transmit two self-decodable RVs, for example, RV0 and RV3, while in other SNR conditions it may be better to transmit one self-decodable RV and one with additional parity bits, for example, RV0 and RV2.

In some example embodiments, the RV indication may be done with either an implicit or an explicit signaling. For implicit feedback, it is allowed to have a single bit set to, for example, 0 when the same RV should be transmitted and, for example, 1 when different RVs should be transmitted, or vice versa. For the cases where different RVs should be transmitted, the specific RV to be used may then be selected by considering a default order, for example, the order used in HARQ (RV0, RV2, RV3, RV1). With the explicit feedback, the terminal device 110 may directly signal the specific RV to be transmitted.

In some example embodiments, whether the FDM-B needs to be evaluated considering a) only the same RV or b) only different RVs or c) both same and different RVs may be configured by the network device 120. For example, the above-mentioned configuration message from the network device 120 may also comprise the information indicating what kind of RV(s) to be considered when using the FDM-B.

As another example, the terminal device may also suggest a pair of beams to be used together with the preferred FDM transmission mode. For a further example, the terminal device 110 may indicate the preference for the pair of beams to be used for the first FDM transmission mode is the pair of (TRP1-beam #1, TRP2-beam #2), or the terminal device 110 may indicate the preference for the pair of beams to be used for the second FDM transmission mode is the pair of (TRP1-beam #3, TRP2-beam #4).

In some example embodiments, after receiving the mode indication of uplink transmission for m-TRP, the network device 120 may determine whether to use the preferred FDM transmission mode as indicated by the mode indication of uplink transmission. In other words, the network device 120 may decide whether to keep the current transmission mode or switch to the transmission mode suggested by the terminal device 110.

In some example embodiments, the network device 120 may determine to use the preferred FDM transmission mode, and may transmit, to the terminal device 110, an indication to use the preferred FDM transmission mode. After receiving, from the network device 120, the indication to use the preferred FDM transmission mode, the terminal device 110 may then switch to the preferred one of FDM transmission modes. Then, the network device 120 may perform an uplink reception in the preferred FDM transmission mode based on the determination that the preferred FDM transmission mode is used.

The indication to use the preferred FDM transmission mode may be transmitted by, for example, a physical layer signaling, that is, L1 signaling. In this case, the indication may be transmitted within PDCCH. As another example, the indication to use the preferred FDM transmission mode may be transmitted by a MAC CE or an RRC signaling. Considering the dynamic nature of the channel and the required updates of the FDM schemes, the transmission of the indication by the L1 may be a better choice.

In some other example embodiments, the terminal device 110 may switch to the preferred FDM transmission mode directly after the transmission of the mode indication. In this case, the network device 120 may not instruct the terminal device 110 to use one of the FDM transmission modes, instead, it may allow the terminal device 110 to switch autonomously between different FDM transmission modes. Then, the terminal device 110 may then autonomously decide to use either the first or the second FDM transmission mode, for example, on the PRBs scheduled by the network device 120. The network device 120 may then try to decode the received packet by testing different decoding methods for the FDM transmission modes.

In some example embodiments, the above-mentioned configuration message from the network device 120 may also comprise the information indicating uplink interference power measurements to allow the terminal device 110 to predict uplink SINR rather than uplink SNR. This may be helpful for instance when the terminal device 110 is interference-limited and not noise-limited.

In this way, there is provided a novel method and NR signaling framework to allow the network to dynamically switch for a multi-panel terminal device between different uplink FDM transmission modes (for example, the FDM-A and the FDM-B) for simultaneous PUSCH and/or PUCCH transmission, based on the assistance or indication information received from the device.

Besides, in some example embodiments, the uplink SNR may be estimated based on different configurations. In other words, the terminal device 110 may estimate the uplink SNR based on different beam configurations or selections. For example, the terminal device 110 may estimate the uplink SNR by estimating the uplink SNR based on current active beams at the terminal device 110. As another example, the terminal device 110 may estimate the uplink SNR by estimating the uplink SNR based on the current active beams and estimating an uplink SNR based on additional beams at the terminal device 110. As a further example, the terminal device 110 may estimate the uplink SNR by estimating the uplink SNR based on the current active beams and further predicting an uplink SNR for additional beams based on a result of the estimating.

In the following, the estimation of the uplink SNR will be discussed with reference to FIG. 5A, FIG. 5B and FIG. 5C respectively. For the purpose of discussion, the following discussions regarding the FIG. 5A, FIG. 5B and FIG. 5C will be described with reference to FIG. 1.

Figure 5A:
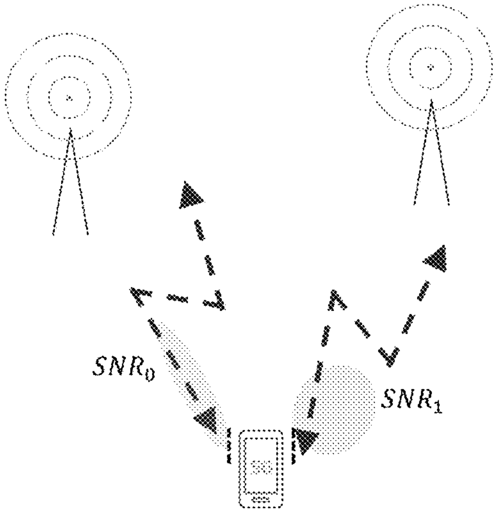
FIG. 5A illustrates an example scheme of estimation of uplink SNRs with current active beams according to some example embodiments of the present disclosure.

FIG. 5A illustrates an example estimation of uplink SNRs with current active beams according to some example embodiments of the present disclosure. In this case, the terminal device 110 may estimate the uplink SNR by estimating the uplink SNR based on current active beams at the terminal device 110.

With the estimation approach as shown in FIG. 5A, the terminal device 110 may estimate the uplink SNR using the current active beams, for example, based on the RSRP measurements, configured uplink power control parameters, each panel power headroom, and predicted thermal noise power of the network device 120. Then, the terminal device 110 may determine the selected performance indicator (for example, the achievable SE) for both the first and second FDM transmission modes based on the estimated SNR.

Further, the terminal device 110 may feed back to the network device 120 its preferred FDM transmission mode among the first and second FDM transmission modes (for example, among the FDM-B and the FDM-A), i.e., the one providing a better value for the selected performance indicator, for example, a larger achievable SE.

Figure 5B:
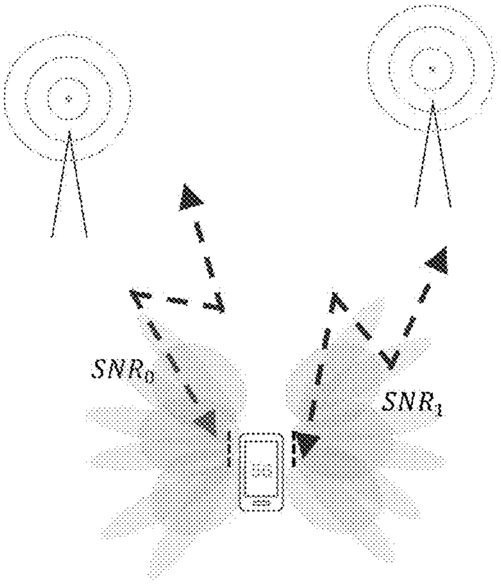
FIG. 5B illustrates an example scheme of estimation of uplink SNRs with current active beams and additional beams according to some example embodiments of the present disclosure.

FIG. 5B illustrates another example estimation of uplink SNRs with current active beams and additional beams according to some example embodiment of the present disclosure. In other words, a beam adaptation scheme is used in FIG. 5B. In this case, the terminal device 110 may estimate the uplink SNR by both estimating the uplink SNR based on the current active beams and estimating an uplink SNR based on additional beams at the terminal device 110.

For example, the terminal device 110 may be allowed to perform measurements on further beams other than the current active beams, which may also be referred to as additional beams, instead of performing measurements just on the current active beams as illustrated in FIG. 5A. The additional beams may have different beam directions, different beam widths, and activation or deactivation of specific active antenna elements of the antenna array. For example, it may be up to the terminal device 110 to decide which beams to probe. On the other hand, to probe the additional beams, the terminal device 110 may rely on the network device 120 to transmit additional reference signals to perform additional measurements (e.g., CSI-RS repetitions, SS bursts, or other techniques).

With the estimation approach as shown in FIG. 5B, the terminal device 110 may estimate the uplink SNR using the current active beams, for example, based on the RSRP measurements, configured uplink power control parameters, each panel power headroom, and predicted thermal noise power. Then, the terminal device 110 may transmit, to the network device 120, a request for additional reference signals to improve m-TRP FDM transmission mode assessment.

In response to such a request, the network device 120 may transmit to the terminal device 110 a grant for the additional reference signals, and informs the TRPs to transmit additional reference signals. Accordingly, the TRPs may transmit for example additional CSI-RSs to allow further measurements at the terminal device 110. Then, the terminal device 110 may perform an SNR estimation on the additional reference signals from the network device 120 using the additional beams.

The terminal device 110 may then determine the selected performance indicator (for example, the achievable SE) for both the first and second FDM transmission modes, based on the estimated uplink SNR using the current active beams and the estimated uplink SNR using the additional beams. The terminal device 110 may then feed back to the network device 120 its preferred FDM transmission mode among the first and second FDM transmission modes (for example, among the FDM-B and the FDM-A), i.e., the one providing a better value for the selected performance indicator, for example, a larger achievable SE.

On the other hand, in case the network device 120 does not grant additional resources to the terminal device 110 to probe the additional beams, the terminal device 110 may fall back to determine the preferred FDM transmission mode based on measurements using the current active beams and send back it to the network device.

Figure 5C:
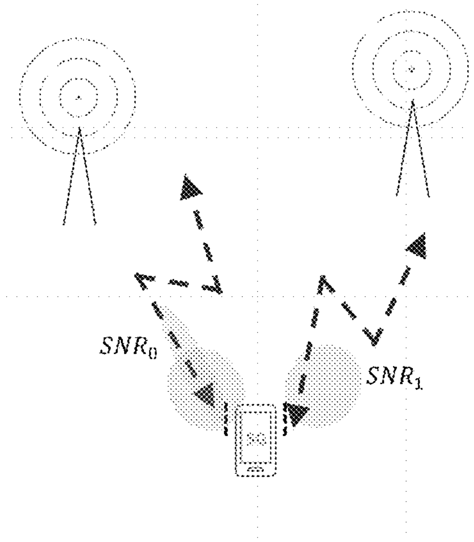
FIG. 5C illustrates an example scheme of estimation of uplink SNRs with current active beams and further prediction of an uplink SNR for additional beams according to some example embodiments of the present disclosure.

FIG. 5C illustrates a further example estimation of uplink SNRs with current active beams and further prediction of an uplink SNR for additional beams according to some example embodiments of the present disclosure. In this case, the terminal device 110 may estimate the uplink SNR by estimating the uplink SNR based on the current active beams and by further predicting an uplink SNR for additional beams based on a result of the estimating using the current active beams.

In this case, the terminal device 110 does not need to ask for additional reference signals from the network device 120 to probe different beams. The terminal device 110 may perform the selection among the first and the second FDM transmission modes just using the current active beams. Besides, the terminal device 110 may do not assume just the uplink SNRs estimated with the current active beams, but also do some prediction about potential SNRs achievable with other beams, for example, wider or narrower beams toward the same direction as the current active beams.

With the estimation approach as shown in FIG. 5C, the terminal device 110 may estimate the uplink SNR using the current active beams, for example, based on the RSRP measurements, configured uplink power control parameters, each panel power headroom, and predicted thermal noise power at the network device.

Then, the terminal device 110 may predict SNRs that are achieved by using a certain number of different beams, which may depend on the implementation of the terminal device 110. As an example, narrower beams pointing toward the same direction as the current active beams may be assumed to provide a 3 dB gain when doubling the number of active antenna elements in the antenna array.

In practical applications, this 3 dB gain (or loss) when doubling (or using half of) active antenna elements, is a simple approximation considering only the beamforming gain. Therefore, more advanced prediction methods may be used, for instance taking into account potential estimates of the angular spread of the channel. If measurements are done with a narrow beam, the prediction may show that there is an overall gain when using a wider beam, for the reason that although using the wider beam has lower beamforming gain, it is allowed to capture more power in some scenarios with large angular spread.

Then, the terminal device 110 may determine the maximum of the selected performance indicator (for example, the achievable SE) for both the first and second FDM transmission modes. For example, the maximum may be computed considering a pair of either measured or predicted beams. Further, the terminal device 110 may feed back to the network device 120 its preferred FDM transmission mode among the first and second FDM transmission modes (for example, among the FDM-B and the FDM-A), i.e., the one providing a better value for the selected performance indicator, for example, a larger achievable SE.

In some example embodiments, on which beams to perform the RSRP measurements and/or on how many beams to perform the RSRP measurements may be configured by the network device in advance. For example, the above-mentioned configuration message from the network device 120 may also comprise the information indicating performing the RSRP measurements on which beams and/or performing the RSRP measurements on how many beams.

Figure 6:
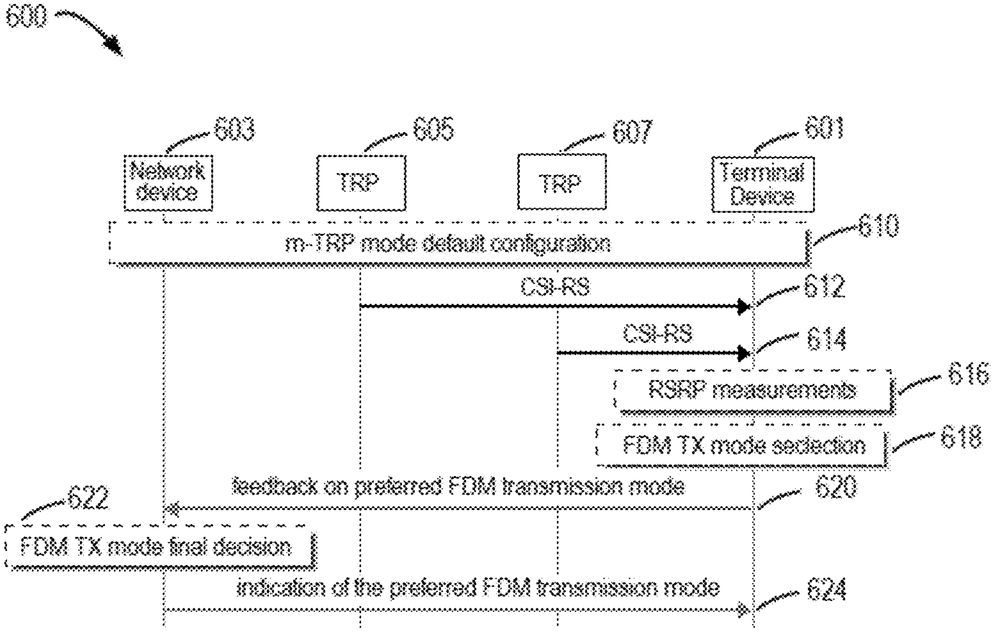
FIG. 6 illustrates an example process for dynamically switching among FDM transmission modes in an m-TRP scenario according to some example embodiments of the present disclosure.

FIG. 6 illustrates an example process 600 for dynamically switching among FDM transmission modes in an m-TRP scenario according to some example embodiments of the present disclosure. For the purpose of discussion, the process 600 will be described with reference to FIG. 1. In this case, the terminal device 110 is implemented by a terminal device 601, such as a UE, and the network device 120 is implemented by a network device 603, such as a gNB. The terminal device 601 is connected to the TRPs 605 and 607. In this case, the FDM-A and the FDM-B are used as the candidate FDM transmission modes for dynamic switching for PUSCH and/or PUCCH. It would be appreciated that although the process 600 has been described in the network environment 100 of FIG. 1, this process flow may be likewise applied to other communication scenarios.

As shown in FIG. 6, at 610, the network device 603 configures the terminal device 601 with multiple panels to operate in an mTRP mode. At 612 and 614, the TRPs 605 and 607 transmit CSI-RSs respectively to allow measurements at the terminal device 601. At 616, the terminal device 601 measures RSRP for each TRP and each panel.

At 618, the terminal device 601 determines for PUSCH and/or PUCCH its preference among the FDM-A and the FDM-B. For example, the preferred FDM transmission mode may be determined in any approach described above with reference to FIGS. 2-5C.

Then, at 620, the terminal device 601 transmits, to the network device 603, the feedback on the preferred FDM transmission mode. At 622, the network device 603 processes the feedback from the terminal device 601, and decides whether to keep the current FDM transmission mode or to switch to the preferred FDM transmission mode suggested by the terminal device 601. At 624, if the network device 603 decides to switch to the preferred FDM transmission mode suggested by the terminal device 601, it transmits, to the terminal device 601, an indication of the preferred FDM transmission mode to indicate the terminal device 601 to switch to the preferred FDM transmission mode from the current FDM transmission mode.

All operations and features as described above with reference to FIGS. 2-5C are likewise applicable to the process 600 and have similar effects. For the purpose of simplification, the details will be omitted.

Figure 7:
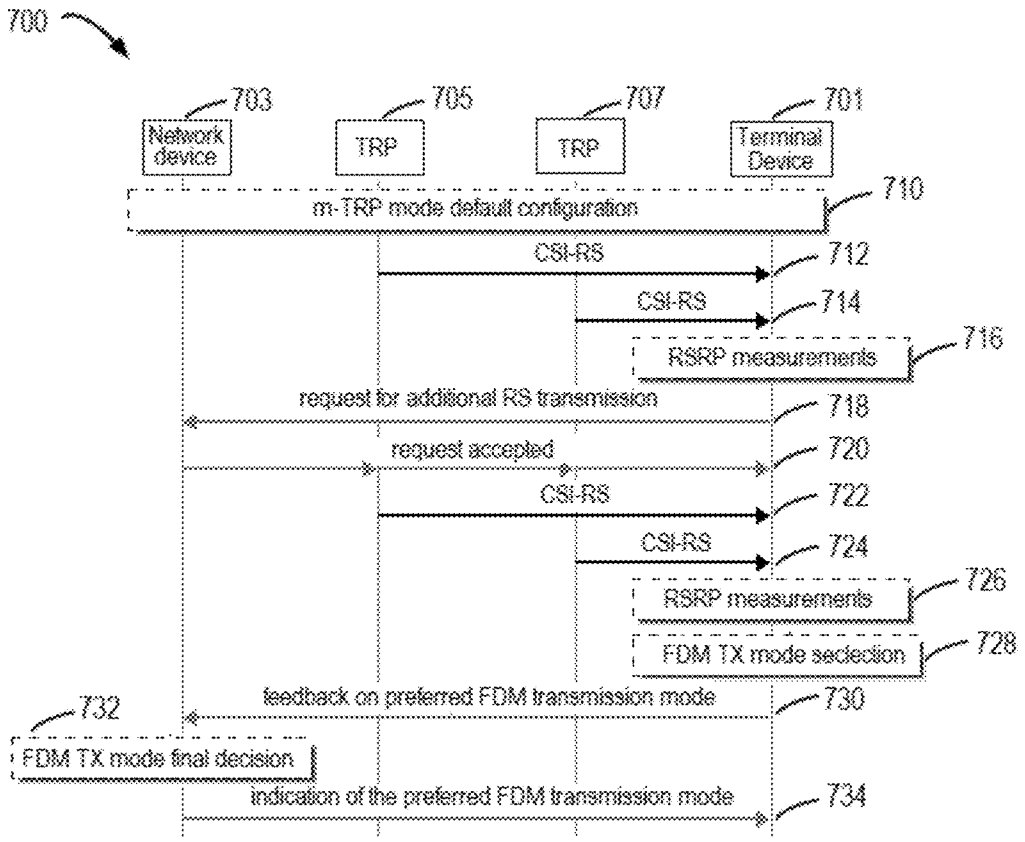
FIG. 7 illustrates another example process for dynamically switching among FDM transmission modes in an m-TRP scenario according to some example embodiments of the present disclosure.

FIG. 7 illustrates another example process 700 for dynamically switching among FDM transmission modes in an m-TRP scenario according to some example embodiments of the present disclosure. For the purpose of discussion, the process 700 will be described with reference to FIG. 1. In this case, the terminal device 110 is implemented by a terminal device 701, such as a UE, and the network device 120 is implemented by a network device 703, such as a gNB. The terminal device 701 is connected to the TRPs 705 and 707. In this case, the FDM-A and the FDM-B are used as the candidate FDM transmission modes for dynamic switching for PUSCH and/or PUCCH. It would be appreciated that although the process 700 has been described in the network environment 100 of FIG. 1, this process flow may be likewise applied to other communication scenarios.

As shown in FIG. 7, at 710, the network device 703 configures the terminal device 701 with multiple panels to operate in an mTRP mode. At 712 and 714, the TRP 705 and 707 transmit CSI-RSs respectively to allow measurements at the terminal device 701. At 716, the terminal device 701 measures RSRP for each TRP and each panel.

At 718, the terminal device 701 transmits to the network device 703 a request for additional reference signals to improve m-TRP FDM transmission mode assessment. At 720, the network device 703 accepts the request from the terminal device 701. At 722 and 724, the TRPs 705 and 707 further transmit CSI-RSs respectively to allow additional measurements at the terminal device 701. At 726, the terminal device 701 measures RSRP for each TRP and each panel based on the additional reference signals.

At 728, the terminal device 701 determines for PUSCH and/or PUCCH its preference among the FDM-A and the FDM-B. For example, the preferred FDM transmission mode may be determined in any approach described above with reference to FIGS. 2-5C.

Then, at 730, the terminal device 701 transmits, to the network device 703, the feedback on the preferred FDM transmission mode. At 732, the network device 703 processes the feedback from the terminal device 701, and decides whether to keep the current FDM transmission mode or to switch to the preferred FDM transmission mode suggested by the terminal device 701. At 734, if the network device 703 decides to switch to the preferred FDM transmission mode suggested by the terminal device 701, it transmits, to the terminal device 701, an indication of the preferred FDM transmission mode to indicate the terminal device 701 to switch to the preferred FDM transmission mode from the current FDM transmission mode.

All operations and features as described above with reference to FIGS. 2-5C are likewise applicable to the process 700 and have similar effects. For the purpose of simplification, the details will be omitted.

Figure 8:
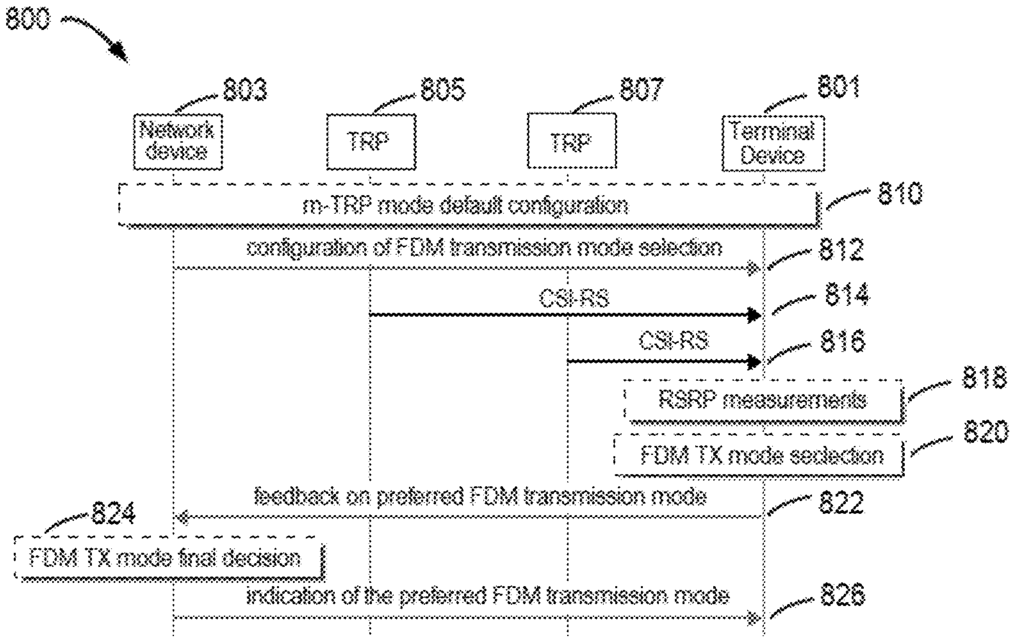
FIG. 8 illustrates a further example process for dynamically switching among FDM transmission modes in an m-TRP scenario according to some example embodiments of the present disclosure.

FIG. 8 illustrates a further example process 800 for dynamically switching among FDM transmission modes in an m-TRP scenario according to some example embodiments of the present disclosure. In this case, the terminal device 110 is implemented by a terminal device 801, such as a UE, and the network device 120 is implemented by a network device 803, such as a gNB. The terminal device 801 is connected to the TRPs 805 and 807. In this case, the FDM-A and the FDM-B are used as the candidate FDM transmission modes for dynamic switching for PUSCH and/or PUCCH. For the purpose of discussion, the process 800 will be described with reference to FIG. 1. It would be appreciated that although the process 800 has been described in the network environment 100 of FIG. 1, this process flow may be likewise applied to other communication scenarios.

As shown in FIG. 8, at 810, the network device 803 configures the terminal device 801 with multiple panels to operate in an mTRP mode. At 812, the network device 803 transmits to the terminal device 801 a configuration of FDM transmission mode selection. For example, the configuration may comprise any parameter configured by the network associated with the FDM transmission mode selection described above with reference to FIGS. 2-5C.

At 814 and 816, the TRPs 805 and 807 transmit CSI-RSs respectively to allow measurements at the terminal device 801. At 818, the terminal device 801 measures RSRP for each TRP and each panel.

At 820, the terminal device 801 determines for PUSCH and/or PUCCH its preference among the FDM-A and the FDM-B. For example, the preferred FDM transmission mode may be determined in any approach described above with reference to FIGS. 2-5C.

Then, at 822, the terminal device 801 transmits, to the network device 803, the feedback on the preferred FDM transmission mode. At 824, the network device 803 processes the feedback from the terminal device 801, and decides whether to keep the current FDM transmission mode or to switch to the preferred FDM transmission mode suggested by the terminal device 801. At 826, if the network device 803 decides to switch to the preferred FDM transmission mode suggested by the terminal device 801, it transmits, to the terminal device 801, an indication of the preferred FDM transmission mode to indicate the terminal device 801 to switch to the preferred FDM transmission mode from the current FDM transmission mode.

All operations and features as described above with reference to FIGS. 2-5C are likewise applicable to the process 800 and have similar effects. For the purpose of simplification, the details will be omitted.

Figure 9:
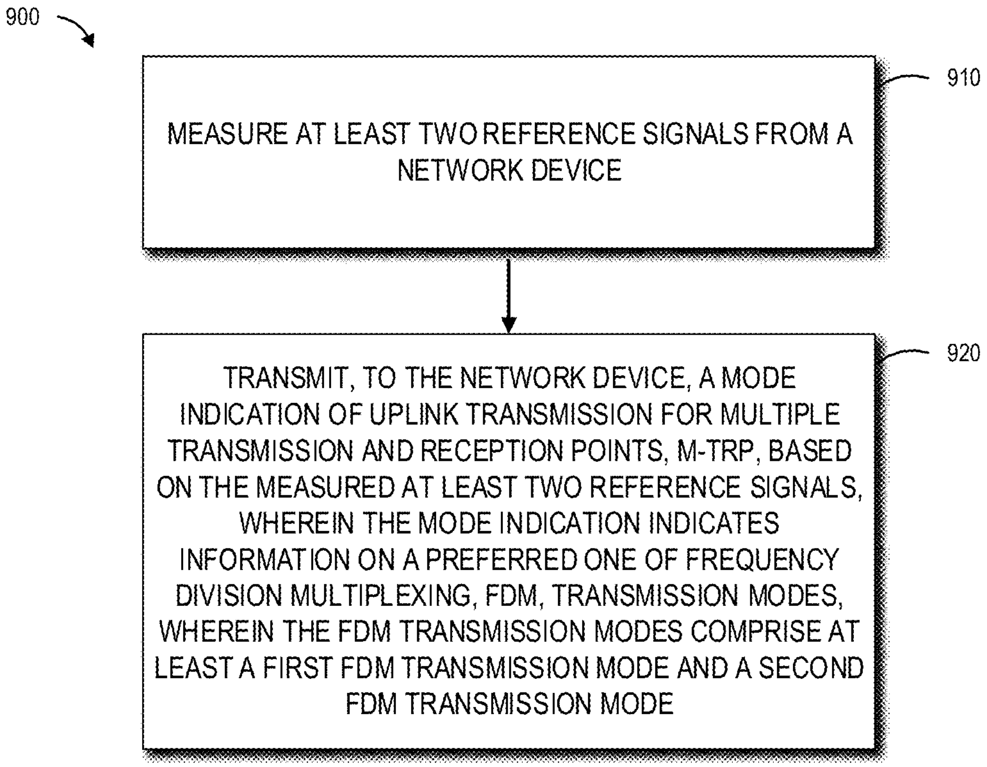
FIG. 9 illustrates an example flowchart of a method implemented at a terminal device according to example embodiments of the present disclosure.

FIG. 9 illustrates an example flowchart of a method 900 implemented at a terminal device according to example embodiments of the present disclosure. For the purpose of discussion, the method 900 will be described from the perspective of the terminal device 110 with reference to FIG. 1.

At 910, the terminal device 110 measures at least two reference signals from the network device 120. At 920, the terminal device 110 transmits, to the network device 120, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In some example embodiments, the first FDM transmission mode may indicate that different parts of a frequency domain resource of one uplink transmission are transmitted with different transmission configuration indication, TCI, states configured for the terminal device 110, and/or the second FDM transmission mode may indicate that two uplink transmission occasions are transmitted with different TCI states configured for the terminal device 110 on non-overlapping frequency resources and a same time-domain resource.

In some example embodiments, the terminal device 110 may be further caused to: receive a threshold configuration from the network device 120, wherein the threshold configuration indicates a first threshold and a second threshold for triggering a transmission of the mode indication regarding the first FDM transmission mode and the second FDM transmission mode. In some example embodiments, the preferred one of the FDM transmission modes is determined based on a gap between signal qualities estimated using the at least two reference signals, the first threshold and the second threshold.

In some example embodiments, the terminal device 110 may be further caused to: trigger a transmission of the mode indication regarding the first FDM transmission mode when the gap between the signal qualities estimated using the at least two reference signals is smaller than a first threshold, or trigger a transmission of the mode indication regarding the second FDM mode when the gap between the signal qualities estimated using the at least two reference signals is larger than a second threshold.

In some example embodiments, the preferred one of the FDM transmission modes may be determined based on performance indicators for the FDM transmission modes, and wherein the performance indicators are at least partly based on uplink signal-to-noise ratios, SNR between each panel of the terminal device 110 and each TRP with which each of the at least two reference signals is associated.

In some example embodiments, the performance indicators for the FDM transmission modes may comprise one of: respective achievable SNRs for the FDM transmission modes; respective achievable spectral efficiencies for the FDM transmission modes; respective achievable throughputs for the FDM transmission modes; or respective achievable reliabilities for the FDM transmission modes. In some example embodiments, the terminal device 110 is further caused to: obtain, from the network device 120, a performance indicator configuration, and wherein the performance indicator configuration indicates a type of performance indicators for determining the preferred one of the FDM transmission modes.

In some example embodiments, the terminal device 110 may be further caused to: estimate an uplink SNR between each panel of the terminal device 110 and each TRP with which each of the at least two reference signals is associated, based on one or more of: measured reference signal received power, RSRP, of the at least two reference signals; a configured uplink power control parameter; a power headroom; or a noise figure prediction at the network device 120.

In some example embodiments, the terminal device 110 may be caused to estimate the uplink SNR by any of: estimating the uplink SNR based on current active beams at the terminal device 110; estimating the uplink SNR based on the current active beams and estimating an uplink SNR based on additional beams at the terminal device 110; or estimating the uplink SNR based on the current active beams and further predicting an uplink SNR for additional beams based on a result of the estimating.

In some example embodiments, the terminal device 110 may be further caused to estimate the uplink SNR based on the additional beams by: transmitting, to the network device 120, a request for additional reference signals; receiving from the network device 120 a grant for the additional reference signals; and performing an SNR estimation on the additional reference signals from the network device 120 using the additional beams.

In some example embodiments, the mode indication of uplink transmission may be transmitted by any of: a physical layer signaling; a media access control control element, MAC-CE; or a radio resource control, RRC, signaling.

In some example embodiments, the mode indication of uplink transmission may comprise one or more of: the preferred FDM transmission mode; a redundancy version indication for the second FDM transmission mode; estimated uplink SNRs for the at least one reference signal; or performance indicators for the FDM transmission modes.

In some example embodiments, the terminal device 110 may be further caused to: switch to the preferred FDM transmission mode after the transmission of the mode indication.

In some example embodiments, the terminal device 110 may be further caused to: receive, from the network device 120, an indication to use the preferred FDM transmission mode before switching to the preferred one of FDM transmission modes.

In some example embodiments, each of the at least two reference signals may be associated with one TCI state.

Figure 10:
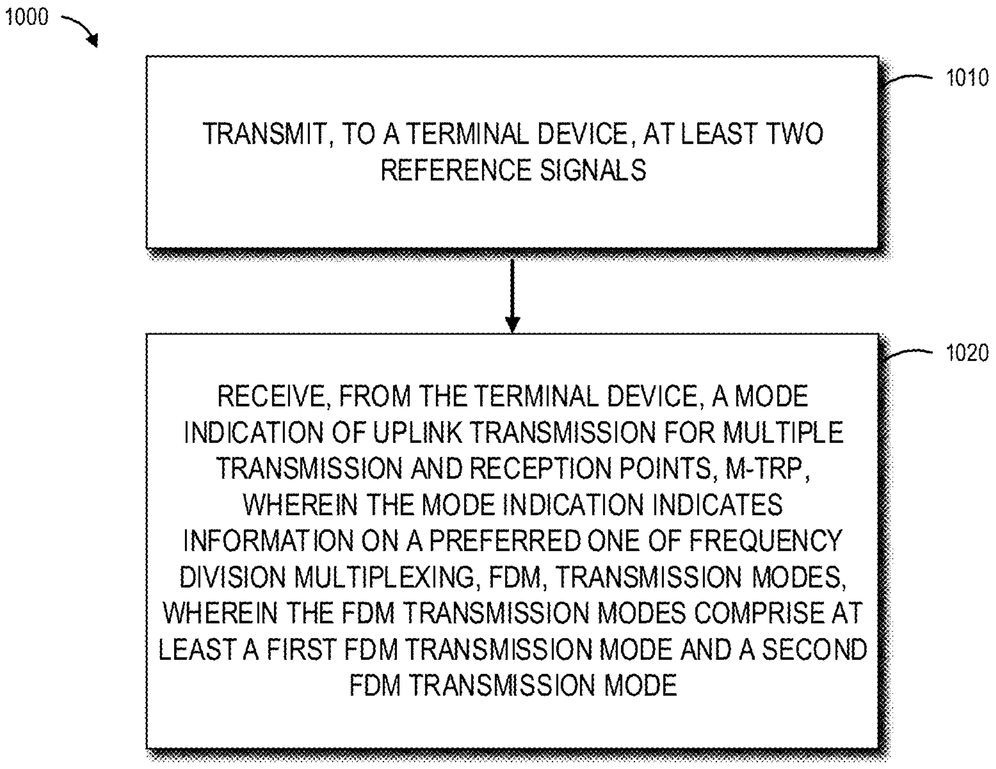
FIG. 10 illustrates an example flowchart of a method implemented at a network device according to example embodiments of the present disclosure.

FIG. 10 shows a flowchart of an example method 1000 implemented at a network device (for example, the network device 120) in accordance with some embodiments of the present disclosure. For the purpose of discussion, the method 1000 will be described from the perspective of the network device 120 with reference to FIG. 1.

At 1010, the network device 120 transmits, to the terminal device 110, at least two reference signals. At 1020, the network device 120 receives, from the terminal device 110, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode.

In some example embodiments, the first FDM transmission mode may indicate that different parts of a frequency domain resource of one uplink transmission are transmitted with different transmission configuration indication, TCI, states configured for the terminal device 110, and/or the second FDM transmission mode may indicate that two uplink transmission occasions are transmitted with different TCI states configured for the terminal device 110 on non-overlapping frequency resources and a same time-domain resource.

In some example embodiments, the network device 120 may be further caused to: transmit a threshold configuration to the terminal device 110, wherein the threshold configuration may indicate a configured value of one or more of a first threshold and a second threshold for triggering a transmission of the mode indication regarding the first FDM transmission mode and the second FDM transmission mode.

In some example embodiments, the network device 120 may be further caused to: transmit, to the terminal device 110, a performance indicator configuration, and wherein the performance indicator configuration may indicate a type of performance indicators for determining the preferred one of the FDM transmission modes. In some example embodiments, the performance indicators for the FDM transmission modes may comprise one of: respective achievable SNRs for the FDM transmission modes; respective achievable spectral efficiencies for the FDM transmission modes; respective achievable throughputs for the FDM transmission modes; or respective achievable reliabilities for the FDM transmission modes.

In some example embodiments, the mode indication of uplink transmission may be received by any of: a physical layer signaling; a media access control control element, MAC-CE; or a radio resource control, RRC, signaling.

In some example embodiments, the mode indication of uplink transmission may comprise one or more of: the preferred FDM transmission mode; a redundancy version indication for the second FDM transmission mode; estimated uplink SNRs for the at least one reference signal; or performance indicators for the FDM transmission modes.

In some example embodiments, the network device 120 may be further caused to: determine whether to use the preferred FDM transmission mode as indicated by the mode indication of uplink transmission; and perform an uplink reception in the preferred FDM transmission mode based on the determination that the preferred FDM transmission mode is used. In some example embodiments, the network device 120 may be further caused to: transmit, to the terminal device 110, an indication to use the preferred FDM transmission mode.

In some example embodiments, each of the at least two reference signals may be associated with one TCI state.

In some example embodiments, an apparatus capable of performing any of operations of the method 900 (for example, the terminal device 110) may include means for performing the respective steps of the method 900. The means may be implemented in any suitable form. For example, the means may be implemented in a circuitry or software module.

In some example embodiments, the apparatus includes means for measuring at least two reference signals from a network device; and means for transmitting, to the network device, a mode indication of uplink transmission for multiple transmission and reception points, m-TRP, based on the measured at least two reference signals, wherein the mode indication indicates information on a preferred one of frequency division multiplexing, FDM, transmission modes, wherein the FDM transmission modes comprise at least a first FDM transmission mode and a second FDM transmission mode.

In some example embodiments, the first FDM transmission mode may indicate different parts of a frequency domain resource of one uplink transmission are transmitted with different transmission configuration indication, TCI, states configured for the terminal device, and/or the second FDM transmission mode may indicate two uplink transmission occasions are transmitted with different TCI states configured for the terminal device on non-overlapping frequency resources and a same time-domain resource.

In some example embodiments, the apparatus may further comprise: means for receiving a threshold configuration from the network device, wherein the threshold configuration may indicate a first threshold and a second threshold for triggering a transmission of the mode indication regarding the first FDM transmission mode and the second FDM transmission mode. In some example embodiments, the preferred one of the FDM transmission modes may be determined based on a gap between signal qualities estimated using the at least two reference signals, the first threshold and the second threshold.

In some example embodiments, the apparatus may further comprise means for triggering a transmission of the mode indication regarding the first FDM transmission mode when the gap between the signal qualities estimated using the at least two reference signals is smaller than a first threshold, or means for triggering a transmission of the mode indication regarding the second FDM mode when the gap between the signal qualities estimated using the at least two reference signals is larger than a second threshold.

In some example embodiments, the preferred one of the FDM transmission modes may be determined based on performance indicators for the FDM transmission modes, and wherein the performance indicators are at least partly based on uplink signal-to-noise ratios, SNR between each panel of the terminal device and each TRP with which each of the at least two reference signals is associated. In some example embodiments, the performance indicators for the FDM transmission modes may comprise one of: respective achievable SNRs for the FDM transmission modes; respective achievable spectral efficiencies for the FDM transmission modes; respective achievable throughputs for the FDM transmission modes; or respective achievable reliabilities for the FDM transmission modes.

In some example embodiments, the apparatus may further comprise means for obtaining, from the network device, a performance indicator configuration, and wherein the performance indicator configuration indicates a type of performance indicators for determining the preferred one of the FDM transmission modes.

In some example embodiments, the apparatus may further comprise means for estimating an uplink SNR between each panel of the terminal device and each TRP with which each of the at least two reference signals is associated, based on one or more of: measured reference signal received power, RSRP, of the at least two reference signals; a configured uplink power control parameter; a power headroom; or a noise figure prediction at the network device.

In some example embodiments, the means for estimating the uplink SNR may comprise any of: means for estimating the uplink SNR based on current active beams at the terminal device; means for estimating the uplink SNR based on the current active beams and estimating an uplink SNR based on additional beams at the terminal device; or means for estimating the uplink SNR based on the current active beams and further predicting an uplink SNR for additional beams based on a result of the estimating.

In some example embodiments, the means for estimating the uplink SNR based on the additional beams may comprise: means for transmitting, to the network device, a request for additional reference signals; means for receiving from the network device a grant for the additional reference signals; and means for performing an SNR estimation on the additional reference signals from the network device using the additional beams.

In some example embodiments, the mode indication of uplink transmission may be transmitted by any of: a physical layer signaling; a media access control control element, MAC-CE; or a radio resource control, RRC, signaling.

In some example embodiments, the mode indication of uplink transmission may comprise one or more of: the preferred FDM transmission mode; a redundancy version indication for the second FDM transmission mode; estimated uplink SNRs for the at least one reference signal; or performance indicators for the FDM transmission modes.

In some example embodiments, the apparatus may further comprise: means for switching to the preferred FDM transmission mode after the transmission of the mode indication. In some example embodiments, the apparatus may further comprise: means for receiving, from the network device, an indication to use the preferred FDM transmission mode before switching to the preferred one of FDM transmission modes.

In some example embodiments, each of the at least two reference signals may be associated with one TCI state.

In some example embodiments, the apparatus may further comprise means for performing other steps in some embodiments of the method 900. In some example embodiments, the means comprises at least one processor and at least one memory including computer program code. The at least one memory and computer program code are configured to, with the at least one processor, cause the performance of the apparatus.

In some example embodiments, an apparatus capable of performing any of the method 1000 (for example, the network device 120) may include means for performing the respective steps of the method 1000. The means may be implemented in any suitable form. For example, the means may be implemented in a circuitry or software module.

In some example embodiments, the apparatus may further include means for transmitting, to a terminal device, at least two reference signals; and means for receive, from the terminal device, a mode indication of uplink transmission for multiple transmission and reception points, m-TRP, wherein the mode indication indicates information on a preferred one of frequency division multiplexing, FDM, transmission modes, wherein the FDM transmission modes comprise at least a first FDM transmission mode and a second FDM transmission mode.

In some example embodiments, the first FDM transmission mode may indicate that different parts of a frequency domain resource of one uplink transmission may be transmitted with different transmission configuration indication, TCI, states configured for the terminal device, and/or the second FDM transmission mode may indicate that two uplink transmission occasions may be transmitted with different TCI states configured for the terminal device on non-overlapping frequency resources and a same time-domain resource.

In some example embodiments, the apparatus may further comprise: means for transmitting a threshold configuration to the terminal device, wherein the threshold configuration may indicate a configured value of one or more of a first threshold and a second threshold for triggering a transmission of the mode indication regarding the first FDM transmission mode and the second FDM transmission mode.

In some example embodiments, the apparatus may further comprise: means for transmitting, to the terminal device, a performance indicator configuration, and wherein the performance indicator configuration indicates a type of performance indicators for determining the preferred one of the FDM transmission modes. In some example embodiments, the performance indicators for the FDM transmission modes may comprise one of: respective achievable SNRs for the FDM transmission modes; respective achievable spectral efficiencies for the FDM transmission modes; respective achievable throughputs for the FDM transmission modes; or respective achievable reliabilities for the FDM transmission modes.

In some example embodiments, the mode indication of uplink transmission may be received by any of: a physical layer signaling; a media access control control element, MAC-CE; or a radio resource control, RRC, signaling.

In some example embodiments, the mode indication of uplink transmission may comprise one or more of: the preferred FDM transmission mode; a redundancy version indication for the second FDM transmission mode; estimated uplink SNRs for the at least one reference signal; or performance indicators for the FDM transmission modes.

In some example embodiments, the apparatus may further comprise means for determining whether to use the preferred FDM transmission mode as indicated by the mode indication of uplink transmission; and means for performing an uplink reception in the preferred FDM transmission mode based on the determination that the preferred FDM transmission mode is used. In some example embodiments, the apparatus may further comprise means for transmitting, to the terminal device, an indication to use the preferred FDM transmission mode.

In some example embodiments, each of the at least two reference signals may be associated with one TCI state.

In some example embodiments, the apparatus may further comprise means for performing other steps in some embodiments of the method 1000. In some example embodiments, the means comprises at least one processor and at least one memory including computer program code. The at least one memory and computer program code are configured to, with the at least one processor, cause the performance of the apparatus.

Figure 11:
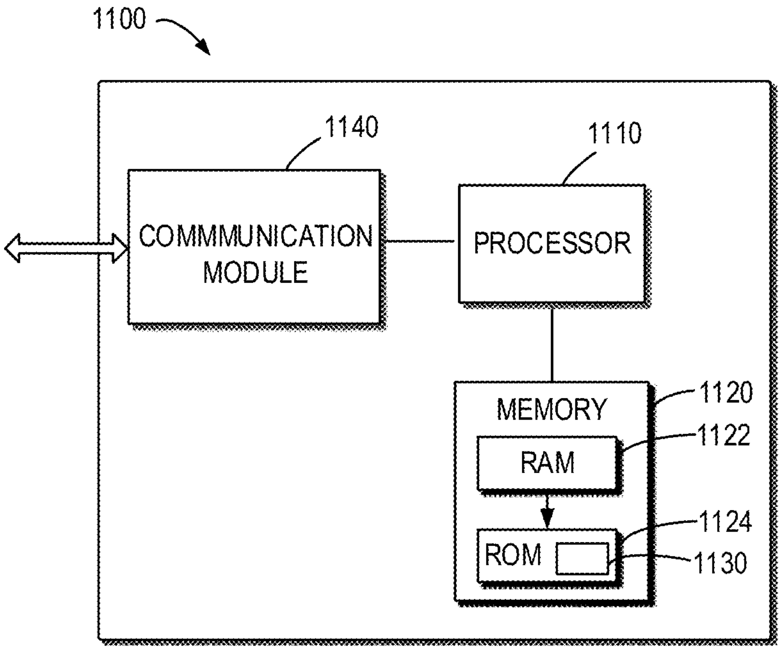
FIG. 11 illustrates an example simplified block diagram of a device that is suitable for implementing embodiments of the present disclosure.

FIG. 11 is a simplified block diagram of a device 1100 that is suitable for implementing embodiments of the present disclosure. The device 1100 may be provided to implement the communication device, for example the terminal device 110 or the network device 120 as shown in FIG. 1. As shown, the device 1100 includes one or more processors 1110, one or more memories 1120 coupled to the processor 1110, and one or more transmitters and/or receivers (TX/RX) 1140 coupled to the processor 1110.

The TX/RX 1140 is for bidirectional communications. The TX/RX 1140 has at least one antenna to facilitate communication. The communication interface may represent any interface that is necessary for communication with other network elements. The communication interface may be hardware or software based interface. For example, the communication interface may be one ere-or more transceivers. The one or more transceivers may be coupled to one or more antennas or antenna ports to wirelessly transmit and/or receive communication signals. The antennas or antenna ports may be the same or different types. The antennas or antenna ports may be located in different positions of an apparatus. The one or more transceivers allow the apparatus to communicate with other devices that may be wired and/or wireless. The transceiver may support one or more radio technologies. For example, the one or more transceivers may include a cellular subsystem, a WLAN subsystem, and/or a Bluetooth™ subsystem. The one or more transceivers may include processors, controllers, radios, sockets, plugs, buffers, or the like circuits to form one or more communication channels to one or more radio frequency units.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a read only memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program so that the device 1100 may perform any process of the disclosure as discussed with reference to FIGS. 2 to 5C. The embodiments of the present disclosure may also be implemented by hardware or by a combination of software and hardware.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like.

Figure 12:
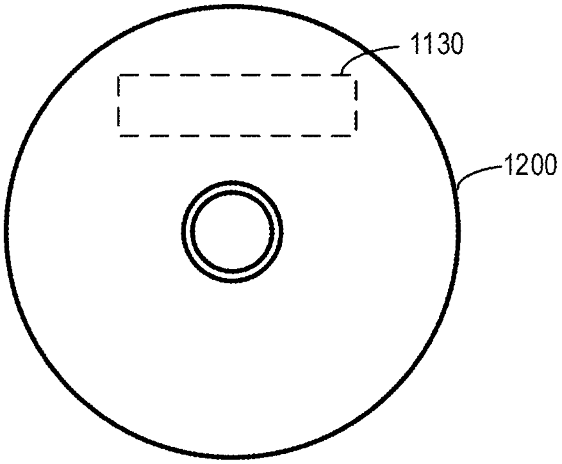
FIG. 12 illustrates an example block diagram of an example computer readable medium in accordance with some embodiments of the present disclosure.

FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 900 or 1000 as described above with reference to FIG. 9 and FIG. 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising: one or more transceivers;

one or more processors communicatively coupled to the one or more transceivers; and one or more memories storing instructions that, when executed by the one or more processors, cause the terminal device to:

measure at least two reference signals from a network device; and transmit, to the network device, a mode indication of uplink transmission for multiple transmission and reception points based on the measured at least two reference signals, wherein the mode indication indicates information on a preferred one of frequency division multiplexing transmission modes, and wherein the frequency division multiplexing transmission modes comprise at least a first frequency division multiplexing transmission mode and a second frequency division multiplexing transmission mode, wherein the preferred one of the frequency division multiplexing transmission modes is determined based on performance indicators for the frequency division multiplexing transmission modes, and wherein the performance indicators are at least partly based on uplink signal-to-noise ratios between each panel of the terminal device and each transmission and reception point with which each of the at least two reference signals is associated, the performance indicators comprise respective achievable signal-to-noise ratios for the frequency division multiplexing transmission modes;

the achievable signal-to-noise ratio (SNR) for the first frequency division multiplexing transmission mode is given by:

$$SNR = -\beta \ln\left(\frac{1}{2}\left(e^{-SNR_0/\beta} + e^{-SNR_1/\beta} + \ldots + e^{-SNR_n/\beta}\right)\right);$$

$\beta$ is a parameter depending on a selected modulation and coding scheme;

the achievable SNR for the second frequency division multiplexing transmission mode is given by:

$$SNR=\sqrt{(1+\eta(SNR_0+SNR_1+\ldots+SNR_n)-1)};$$

$\eta$ is a parameter depending on the selected modulation and coding scheme; and $SNR_0$, $SNR_1$, . . . , $SNR_n$, correspond to uplink signal-to-noise ratios of each panel of the terminal device.

* * * * *